United States Patent
Wright

[15] 3,636,456
[45] Jan. 18, 1972

[54] IMPEDANCE-MEASURING NETWORK

[72] Inventor: Loren G. Wright, Alameda County, Calif.
[73] Assignee: Uthe Technology, Inc., Mountain View, Calif.
[22] Filed: Dec. 29, 1969
[21] Appl. No.: 888,330

[52] U.S. Cl. ................................ 328/32, 73/67.1, 324/57 Z
[51] Int. Cl. .................................. H03k 5/08, G01r 27/00
[58] Field of Search ............... 307/229, 230; 328/26, 28, 31, 328/32, 127, 142; 324/57 A, 57 Z, 61 QL

[56] References Cited

UNITED STATES PATENTS 2,188,611  1/1940  Norton .............................. 328/28 X
2,667,575  1/1954  Haviland .......................... 328/31 X

*Primary Examiner*—Stanley D. Miller, Jr.
*Attorney*—Limbach, Limbach & Sutton

[57] ABSTRACT

A circuit is connected to an ultrasonic transducer being fed by a constant current or constant voltage power supply. By rectifying, differentiating, and amplifying the transducer coil voltage an output signal that is a function of the transducer and load impedance is provided that can be displayed so as to determine the operating condition of the ultrasonic apparatus.

4 Claims, 4 Drawing Figures

IMPEDANCE-MEASURING NETWORK

BACKGROUND OF THE INVENTION

This invention relates to an electronic circuit suitable for use with an ultrasonic power supply of the type described in U.S. Pat. No. 3,445,750 to P. M. Uthe, Jr. et al. In the referenced patent, a low-output impedance power supply is directly connected to an ultrasonic transducer of the type used for cleaning, soldering, drilling, bonding, brazing and welding of materials and a feedback loop is provided to correct for changes in the transducer and load in order to maintain constant transducer current (for driving magnetostrictive transducers) or voltage (for driving ferroelectric and piezoelectric transducers).

It has been found that the variations in transducer voltage or current reflected in the changes in the feedback loop voltage are a measure of changes in transducer and load impedance. Further, the manner of these impedance variations is uniquely related to such factors as the mechanical connection of parts of the bonder such as the horn or a magnet on the transducer or the transducer mounting bracket, the amount of friction in those bearing of the bonder allowing rotation of the transducer, the electrical connection of the transducer to the power supply, the hardness of the wire being bonded, the surface conditions of the parts being joined and the quality of the bond formed.

It is therefore an object of this invention to provide a signal output responsive to the impedance changes of a transducer and load used with the ultrasonic power supply of the referenced patent. It is a further object to provide a signal output of a form readily usable by visual display instruments including oscilloscopes and permanent recording devices.

SUMMARY OF THE INVENTION

An electronic circuit apparatus is provided for sensing the impedance changes in an ultrasonic transducer. The circuit input is connected to the output of the transducer power supply which is connected directly to the ultrasonic transducer. A half-wave rectifier and smoothing filter provides a DC signal having a varying amplitude depending on the impedance variation in the transducer and load. The DC signal is applied to a differential amplifier to provide an output to an external display device. A biasing-type arrangement is provided to permit the output signal to be adjusted for maximum resolution or magnification on the external display.

DESCRIPTION OF THE PREFERRED EMBODIMENTS

While the present invention is directed to an impedance-measuring network useful with many different devices and with many different applications, the network is particularly suited for use with an ultrasonic transducer for providing welds between miniature members such as wire bonding contacts of integrated circuits. Additionally, the present invention includes certain aspects particularly related to ultrasonic wire-bonding techniques, and accordingly the invention will be described for purposes of full disclosure as well as purposes of illustration as practiced with apparatus for ultrasonic wire bonding.

Figure 1:
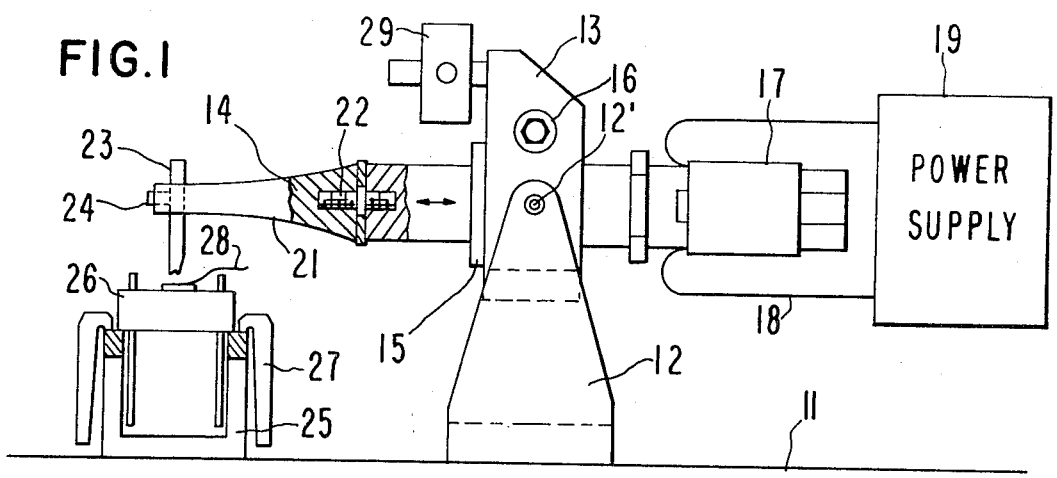
FIG. 1 is a schematic side elevational view showing the general elements used to practice ultrasonic wire bonding where the present invention can be useful.

Referring now to the drawing with particular reference to FIG. 1, there is shown a schematic side elevational view of apparatus useful in ultrasonic wire bonding. The apparatus includes a base or support frame 11 on which is located a mounting yoke 12 pivotally connected to a hollow cylindrical clamping member 13 within which a transducer 14 is held by way of a collar 15 onto which the clamp is tightened, such as by means of a screw or bolt 16. The transducer 14 is any one of a variety of structures for converting electrical energy into high-frequency motion. The transducer 14 includes in or on its body an active element 17 which is typically either magnetostrictive or electrostrictive. High-frequency electrical energy such as in the range of 60 kHz. connected to the active element 17 via lead 18 from a power supply 19 results in vibration of the transducer body. The shape, size and composition of the transducer determine the mechanical resonant frequency thereof, and a power supply capable of delivering a frequency equal to the resonant mechanical frequency is employed to drive the transducer in the performance of its intended function.

The vibrational energy of the transducer is concentrated at one end via an exponential horn 21, typically connected to the transducer body by a screw 22 and provided at its free end with an element for coupling the vibrational energy to the work.

In the case of wire bonding the vibrational energy is directed in a plane parallel to the surface of the elements to be joined, and accordingly the member for coupling energy from the horn to work is a wedge 23 supported in a transverse bore through of the horn 21 and held in place via a setscrew 24.

The workpieces are supported beneath the wedge 23 from an anvil 25 onto which the lower of the pieces 26 such as an integrated circuit chip support or transistor can is clamped such as by a chuck 27. The other member 28 to be joined to the piece part 26 is located between the lower end of wedge 23 and the piece part 26. In the case of wire bonding the part 28 is a wire on the order of 0.0005 to 0.001 inches which is fed from a spool (not shown) into bonding location. For accurate location of such a fine wire a small aperture is often provided in the heel portion of the wedge so that the wire can be threaded therethrough into location beneath the forward portion of the wedge.

A weight 29 is provided on the transducer mounting assembly to produce the desired amount of static force to hold the work members together during the bonding operation.

A bond is accomplished typically by rotating the transducer 14 about the pivot 12' to drop the lower edge of the wedge 23 onto the workpieces. Then, the high-frequency signal is applied from the power supply to the active element 17 for a very short period of time so that a bond results.

Depending upon the size, shape and composition of the elements between the active member 17 and the surface where a bond is to be created between parts 26 and 28, there are certain frequencies of mechanical resonance at which the assembly can be excited at large amplitudes with a sinusoidal electrical signal input. Numerous changes in the transducer and coupling elements can result in a change in impedance presented to the power supply 19. The present invention provides an impedance-measuring network which deflects these changes of impedance for apprising the operator of the apparatus of the operational condition of both the apparatus and the performance of the bonding operation. A memory oscilloscope can be used to determine performance.

A power supply useful in ultrasonic wire bonding wherein changes of impedance do occur is one in which the power delivered to the transducer is controlled in accordance with these changes in impedance. Such a power supply is described in U.S. Pat. No. 3,445,750 referred to above.

The impedance-measuring network of the present invention connected to the power supply of U.S. Pat. No. 3,445,750 provides the appropriate display for the bonder operator in accordance with the aspects of this invention.

Figure 2:
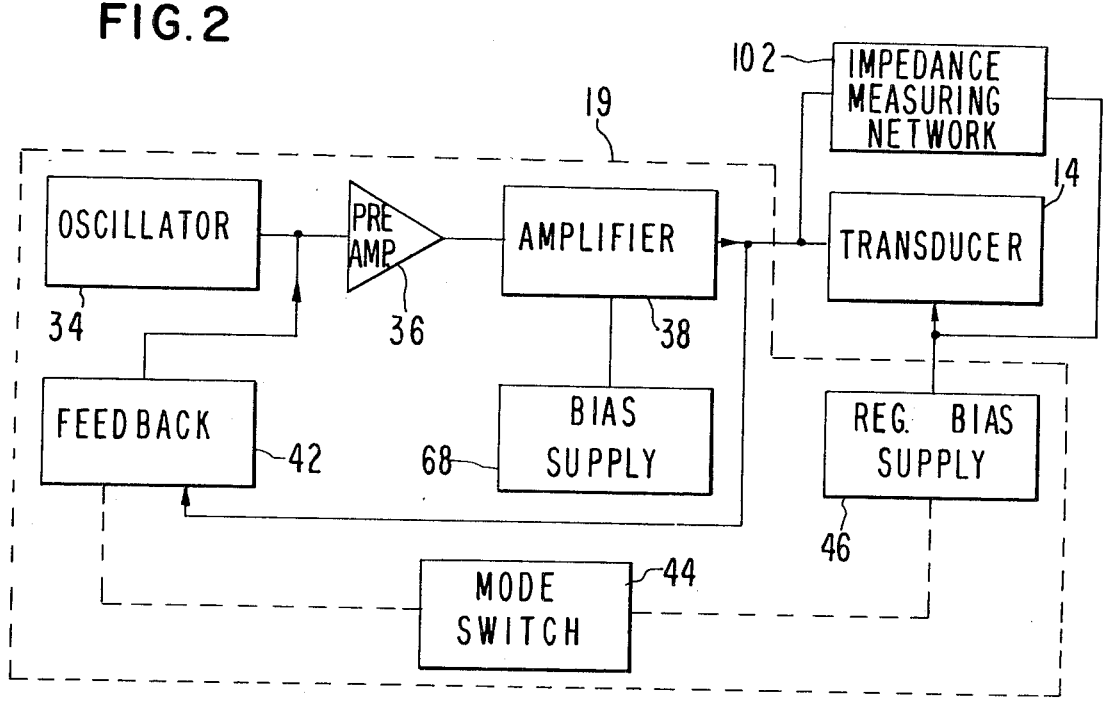
FIG. 2 is a block diagrammatical view of the power supply for an ultrasonic wire bonder incorporating the present invention.

Referring now to FIG. 2, there is shown in ultrasonic power supply 19 of the type usable in connection with the present invention. An oscillator 34 generates a sine wave having a frequency substantially equal to the resonant frequency of the transducer 14 and load. A signal from feedback circuit 42 along with the output of oscillator 34 are applied to preamplifier 36 and to an amplifier 38. Precise regulation of the amplifier 38 is provided by a bias supply 68. A mode switch 44 operates in conjunction with feedback circuit 42 and a fixed regulated bias supply 46 to provide either a constant current or constant voltage to transducer 14, depending on the type of transducer used, either magnetostrictive or electrostrictive, respectively. Bias supply 46 provides a fixed DC bias for magnetostrictive transducers. A power supply of this type is explained in greater detail in the referenced patent.

Figure 3:
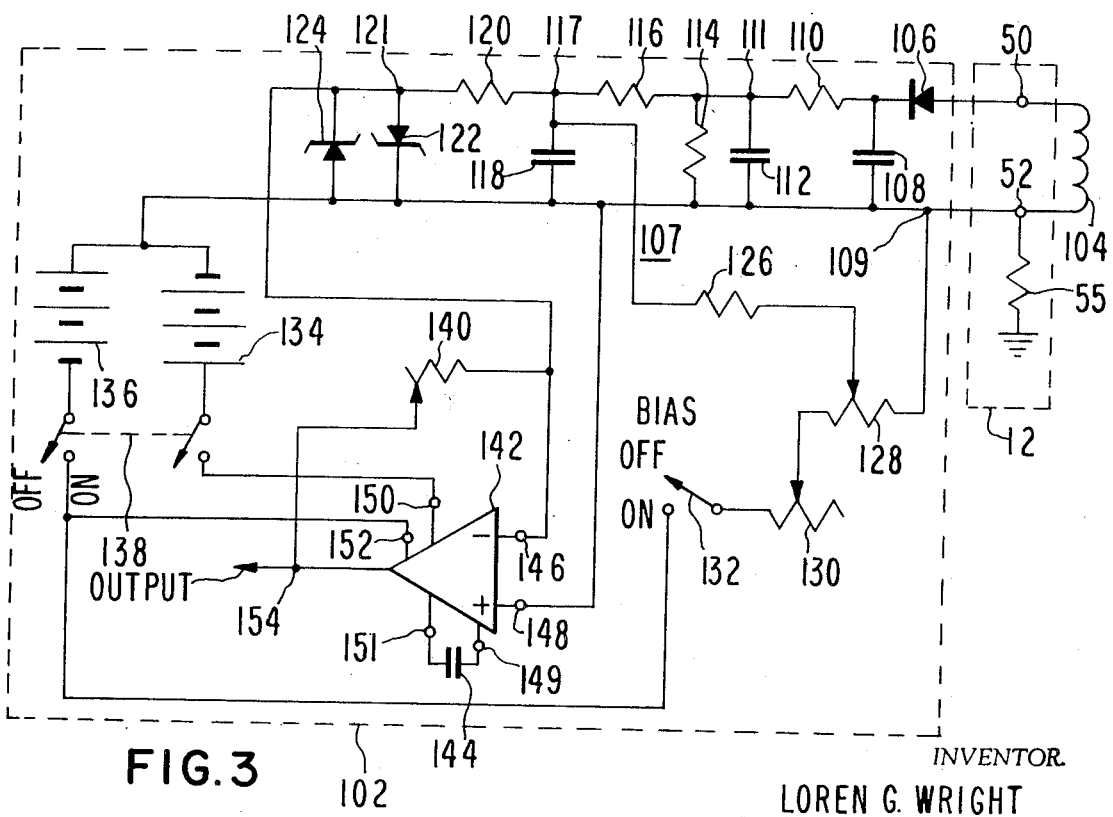
FIG. 3 is a schematic circuit diagram of a preferred embodiment of the impedance-measuring network according to the instant invention.

An impedance-measuring network 102 according to this invention is connected across the transducer 14. Referring now to FIG. 3, the details of network 102 are shown. Network 102 is connected to terminals 50 and 52 of an ultrasonic power supply. A transducer coil 104 is connected to terminals 50 and 52. A low-valued resistor 55 provides a voltage proportional to current flow through coil 104 when the power supply operates in the constant current output mode. Thus a voltage input to impedance network 102 is always presented at terminals 50–52.

The signal applied to network 102 is half-wave rectified by a diode 106 connected with its anode to terminal 50 so that positive pulses are provided at its cathode for smoothing in a filter network 107 consisting of a capacitor 108 connected from the anode of diode 106 to a junction 109 connected to terminal 52, a resistor 110 connected from the anode of diode 106 to a junction 111, a capacitor 112 connected from junction 111 to junction 109, a resistor 114 connected across capacitor 112, a resistor 116 connected between junction 111 and a junction 117, a capacitor 118 connected between junction 117 and junction 109, and a resistor 120 connected between junction 117 and a junction 121. A pair of back-to-back Zener diodes 122 and 124 are connected between junctions 121 and 109 in order to limit the voltage output from the filter. Capacitors 108, 112 and 118 are electrolytic capacitors of the type normally used in power supply applications.

The Zener-limited filter output at junction 121 is applied to the negative input 146 of an operational amplifier (op. amp.) 142. The positive input 148 is taken from junction 109. Capacitor 144 is connected across terminals 149–151 to stabilize the op. amp. to prevent self-oscillations. Amplifier 142 also provides gain necessary to drive the external display device and in addition provides isolation from the ultrasonic power supply.

A potentiometer 140 connected between op. amp. terminals 140 and 154 adjusts the amplifier gain. The network 102 output is taken at terminal 154. A DC supply source such as batteries 134 and 136 provide a positive and negative power supply to terminals 150 and 152 of op. amp. 142, respectively. DPST switch 138 switches the voltages to turn the amplifier on and off.

When the switch 138 is on, a negative voltage is also applied to a SPST "bias" switch 132 and to an end of a potentiometer 130. The rider of pot 130 is connected to one end of a pot 128 which has its other end connected to junction 109. The rider of pot 128 is connected through resistor 126 to junction 117. This "bias" voltage allows the output signal from network 102 to be adjusted so that only a portion of the total waveform is presented. By doing this, for example, the peak of a waveform may be looked at with greater magnification on a display device.

In operation, when the current or voltage through transducer coil 104 remains constant, a constant amplitude sine wave voltage is applied to network 102. The inputs to op. amp. 142 are thus steady DC voltages that are compared to provide a zero output at terminal 154. However, as the impedance of the transducer and load changes, the sine wave will change thus causing the input to op. amp. 142 to vary from the former steady state DC level. The variation is differentially compared to provide an output terminal 154. The structure of the waveform at terminal 154 has been found to provide information as to the nature of the ultrasonic process being performed.

Figure 4:
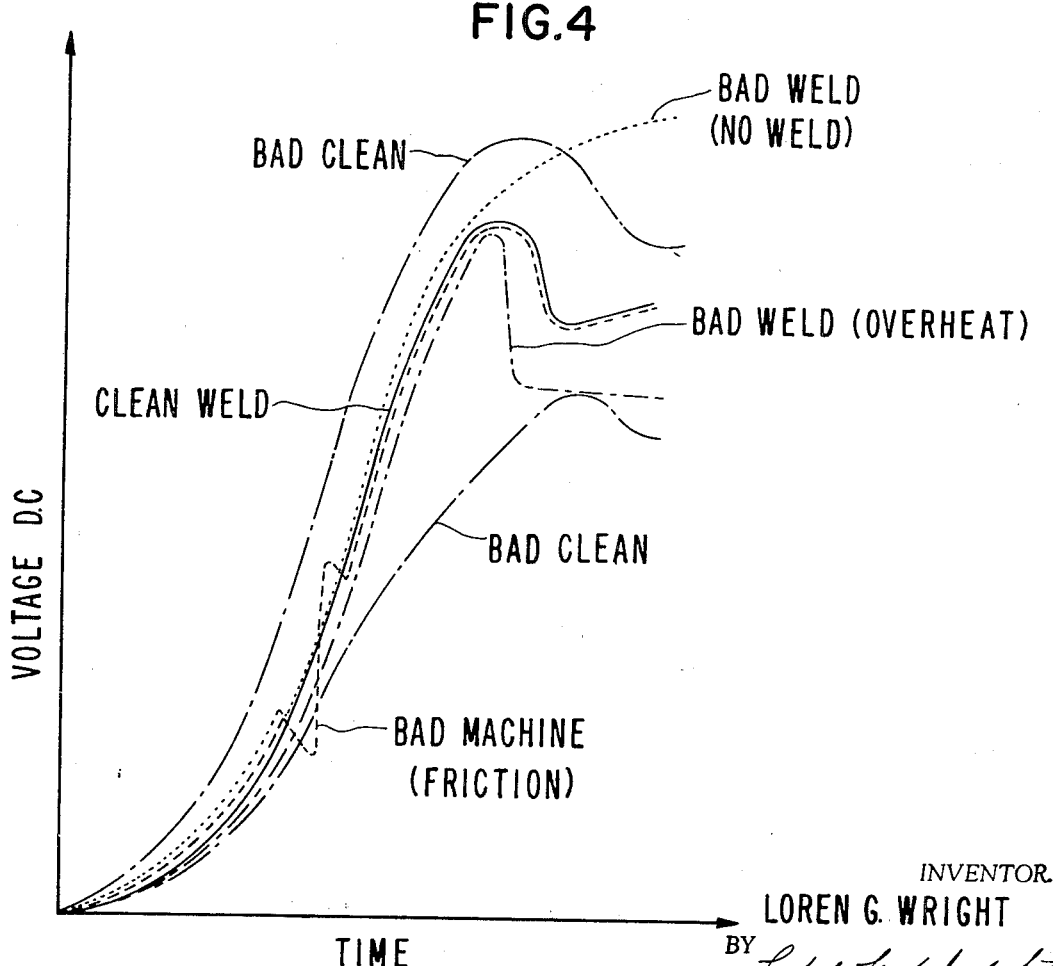
FIG. 4 is a graph showing typical traces on a display device utilizing the present invention.

Such a waveform is shown in FIG. 4 of the drawing wherein the solid curve shows the typical waveform presented by the impedance measuring network of this invention while an ultrasonic bond is accomplished with this invention. It will be noted that the impedance increases with time until the actual bond is achieved. Variations in curves from the typical curve or nonreproducibility of this curve provides an indication that the bonding apparatus is not functioning exactly as desired. By reference to this trace the operator can troubleshoot the apparatus and locate the problem that is preventing reproducibility for accomplishing consistently good welds.

The checkout procedure to locate the trouble can follow the following format. First of all with the transducer 14 in elevated position as shown in FIG. 1 and not in contact with the members to be joined signals from power supply 19 are applied to the transducer and traces are displayed for successive timing cycles. Failure to achieve reproducibility under these circumstances typically indicates that something is loose in or around the transducer 14. This may be a horn 21 that is not tightly screwed onto the transducer body, a loose wedge 23, a loose magnet in the active element section 17, a loose clamp 13 or possibly friction on the bearings at the pivot 12'.

Once reproducibility is achieved with the transducer in elevated position it can be dropped to bring the end of the wedge 23 in contact with the work. Failure to achieve reproducibility in this position can indicate nonuniform friction on the bearings at pivot 12', a loose clamp in the chuck 27 or nonuniform characteristics such as grease on the surface of the work.

Next, the aspects of the weld and welded members can be checked by actually performing welding operations. Failure to achieve reproducibility in accomplishing welds can indicate changes in the hardness of the wire being used or failure to accomplish a good weld by reason of failure of the wedge to sufficiently grip the wire, insufficient or too much time for the application of the ultrasonic vibrations to the weld, or the like.

Thus it will be seen that the present invention provides a quality control for performing ultrasonic welds as well as a method and apparatus for checking out malfunctions in ultrasonic welding machines.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A circuit for providing an output signal that is the function of the impedance of an external system, said circuit being responsive to an input signal voltage, said input signal voltage being applied to said external system, comprising
    a pair of input terminals,
    a half-wave rectifier connected to a first of said input terminal pairs,
    a resistive-capacitive low-pass filter network connected to said rectifier and to the other of said input terminal pairs,
    a differential operational amplifier receiving a pair of inputs from the positive and negative outputs of said filter network,
    a pair of output terminals connected to receive the output of said amplifier.

2. The circuit of claim 1 further comprising biasing means connected to said filter means for shifting the DC level of said filtered signal.

3. The circuit of claim 1 further comprising a variable DC voltage supply connected to said filter network.

4. The circuit of claim 3 further comprising a pair of back-to-back zener diodes connected across the inputs to said operational amplifier.